March 15, 1960 H. SHAMES ET AL 2,928,607
SELF-CLEANING AERATOR
Original Filed May 6, 1954 2 Sheets-Sheet 2
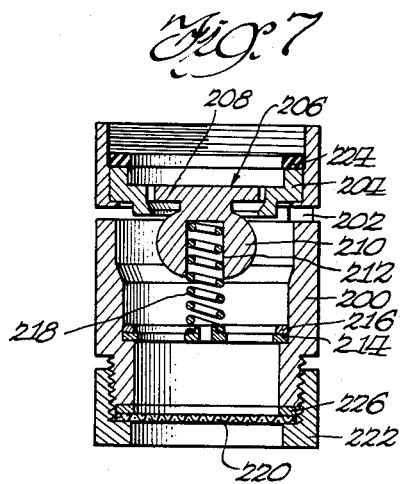
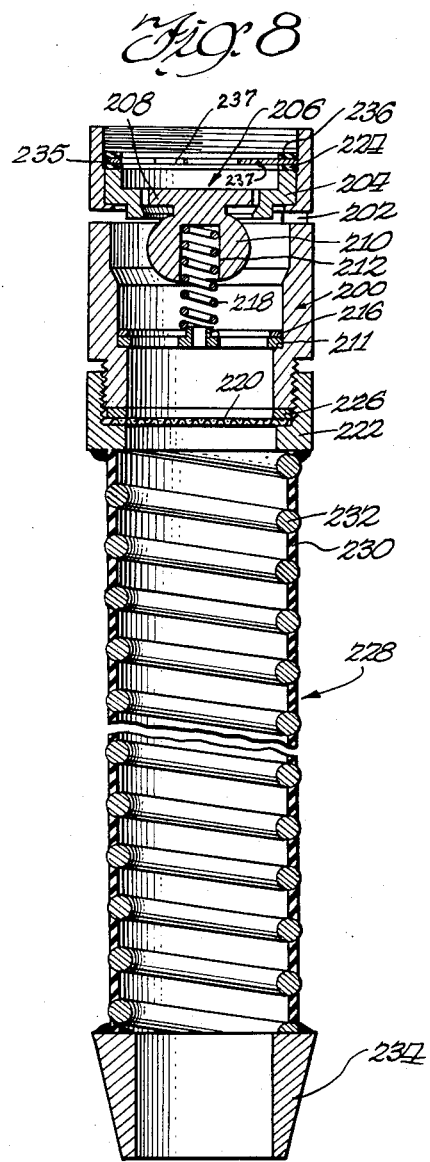
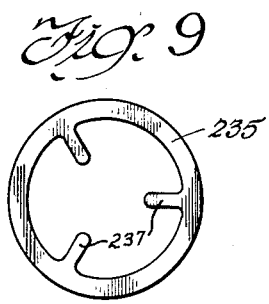
Inventor
Harold Shames
Sidney J. Shames
by Bair, Freeman & Molinare
Attys.

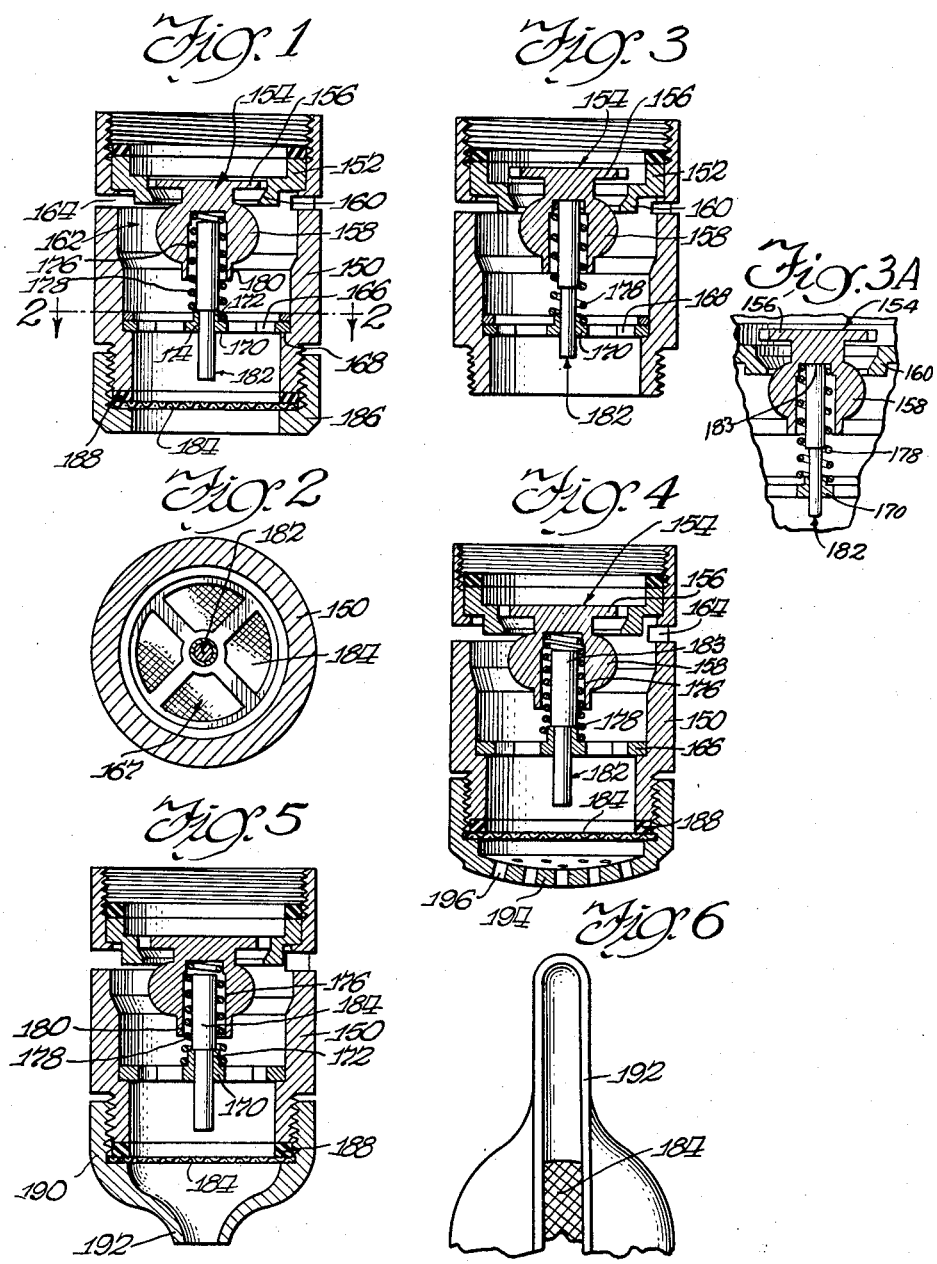

2,928,607
SELF-CLEANING AERATOR

Harold Shames and Sidney J. Shames, Ardsley, N.Y.

Original application May 6, 1954, Serial No. 427,925. Divided and this application May 6, 1959, Serial No. 811,434

10 Claims. (Cl. 239—107)

This application is a division of our copending application Serial No. 427,925, filed May 6, 1954, which application itself is a continuation-in-part of the then copending application Serial No. 279,984, filed April 2, 1952, now issued as Patent No. 2,707,624, of May 3, 1955.

This invention relates to aerating devices. In particular, this invention is directed to the improvement of an aerating device by including means in the aerating device for assisting in cleaning that portion of the aerator that is most likely to become clogged by dirt.

Heretofore, aerating devices that have been provided for domestic use on water faucets in kitchens and bathrooms have included at least one upstream foraminous metering member, such as a screen, or diaphragm having a plurality of fine perforations therethrough, for initially dividing up the flow of water passing through the aerator into a plurality of high velocity jets, and have included one or more downstream screens. One of the greatest difficulties encountered in the use of aerators of this type is the tendency of the upstream screen or perforated diaphragm to become clogged with the tiny particles of dirt and sand which are carried by the water that is being discharged from the faucet. These tiny particles of dirt and sand may be suspended in the water supply and often are small enough to pass the water filtering system, or they may be picked up as the water passes through the water pipes in the home. In any event, they accumulate on the perforated diaphragm or screen and prevent full, efficient operation of the aerator. As the perforated diaphragm or screen becomes clogged, the amount of water which passes through the aerator is reduced, and in addition undesirable back pressures are built up.

Thus, one object of this invention is to provide an aerator for liquids having liquid metering orifices formed by the mating surfaces of a plurality of separable members, with means for maintaining said orifices free of impurities, whereby there is no reduction in the quantity of liquid flow which the aerator is adapted to accommodate.

Another object of this invention is to provide an aerator for liquids, which aerator is adapted to be cleaned of flow restricting impurities without disassembling said aerator or removing it from its operative environs.

A further object of this invention is to provide an automatically self-cleaning aerator for liquids.

The use of a perforated metering disc or screen for initially dividing the flow of water through the aerator up into a plurality of fine high velocity jets has, recently, been criticized as unsanitary. The essence of the complaint is that after the flow of water is turned off, and when using an aerator, some residue portion of water remains in the aerator upstream of the metering disc or screen and is prevented from running out under the force of gravity because of the surface tension that exists in the film that extends across the perforations, or apertures, in the metering disc or screen. The criticism further contends that bacteria laden air can then enter the aerator through the air ports or through the outlet of the aerator and the interior of the aerator, being damp and having residue water therein, provides an excellent breeding place for a colony of bacteria. The above criticism has been raised particularly with respect to the use of aerators in places where sanitation is of utmost importance, such as in hospitals and schools.

Thus, still an additional object of this invention is to provide an aerator which obviates the above criticism of domestic type aerators.

One of the important factors in the product production potential of the United States is the use of high speed machine tools. All high speed tools have the inherent problems of heat dissipation and length of tool life. These problems have been partially solved by the use of coolants in conjunction with the work-cutting operation of the machine tools, by directing streams of coolants onto the work being machined and onto the tool performing its operation on the work. However, the use of coolants has, itself, given rise to other problems arising from the fact that the coolant splashes off the work or tool and generally results in very sloppy and unsafe floor conditions surrounding the machine. At the same time, these machine tool coolants are quite expensive and it is desirable that the loss of coolant be reduced as much as possible.

Still further, because of the high speed of movement (often rotary) of the work and tool, it is difficult to maintain the surfaces of the work or tool wet with the coolant and the coolants must often be supplied in great quantities and at high speed and pressure.

The supplying of coolant to machine tools in high velocity and high pressure streams further contributes to the splash problem above noted. In addition, the failure of the surface of the work, or of the tool, to remain wet decreases the efficiency of heat dissipation, decreases the efficiency of the cutting action of the tool, and decreases the tool life.

Thus, one object of this invention is to provide a novel and improved method of using machine tools by means of which heat dissipation from the work and from the tool may be increase, the cutting action of the tool may be enhanced, and whereby the life of the machine tool may be increased.

A further object of this invention is to provide a novel and improved method of using machine tools provided with liquid coolant means, by means of which the loss of coolant and sloppy floor conditions surrounding the machine may be substantially eliminated.

Another object of this invention is to provide a novel and improved method of using machine tools provided with liquid coolant means, by means of which the wetting of the work, and of the tool, by the coolant, both as to the actual physical concept of wetting and as to the length of time that the wetting exists, is greatly increased.

The novel and improved method of this invention which accomplishes the objects set forth immediately above comprises the steps of heavily aerating the liquid coolant as it is being discharged onto the surface of the tool or work, so that the coolant contains therein a great multitude of fine air bubbles.

It has been found that when a stream of heavily aerated machine tool coolant is used instead of a stream of ordinary coolant, the amount of coolant splash from the tool and work is very greatly reduced. Correspondingly, the sloppy floor condition condition around the machine is, to the greater part, prevented and in some instances completely eliminated.

In addition, the presence of the air bubbles in the coolant enhances the wetting action of the coolant and causes a thin film of coolant to cling to the surfaces of the work and of the tool, and the presence of the liquid film thereon greatly increases the heat dissipation from both the tool and the work, and in over-all performance results in enhanced cutting action of the tool and increases the life of the cutting tool. Furthermore, the thin surface film is not as sensitive to centrifugal forces which may be developed by rotating members and the surface tension of the aerated liquid is often sufficient to keep the film of liquid on the surfaces of the tool and of the work despite centrifugal forces to which the film of coolant may be subjected.

However, the passing of machine tool coolants through an aerator poses a serious problem. In general, the aeration of any recirculating liquid poses the problem of clogging, or fouling, of the aerator by the dirt the liquid picks up as it comes in contact with dirt, or that is picked up through the medium of dirt laden air that is aspirated into the aerator and is intimately mixed with the liquid that is later recirculated. Machine tool coolants, because of their expensiveness, are usually recaptured and recirculated through the machine. It is inherent that the coolant will have therein, in addition to dirt acquired from the dust laden air, fine chips, or shavings, from the work being operated on by the machine tool.

Thus, another object of this invention is to provide a novel and improved aerator for use with liquids that are recirculated through the aerator, which aerator is provided with means for cleaning the aerator without disassembling the aerating mechanism within the aerator.

Further objects and advantages of this invention will become apparent as the following description proceeds and the features of novelty which characterize this invention will be pointed out with particularity in the claims annexed to and forming part of this specification.

Preferred embodiments of the invention are shown in the accompanying drawings, in which:

Figure 1 is a cross-section view of one form of the self-cleaning aerator with this figure showing the position of the parts when liquid is flowing therethrough; and this aerator being additionally provided with a splash reducing means, in the form of a screen, at its outlet end;

Figure 2 is a cross-section view taken substantially on line 2—2 of Figure 1;

Figure 3 is a cross-section view of a portion of the self-cleaning aerator of Figure 1, showing portions of the aerator mechanism in position for flushing out the metering orifices and means for maintaining said portions of aerator in the flushing-out position even when water is flowing therethrough;

Figure 3A is a fragmentary view similar to Figure 3 and illustrates a modified form of the device of Figure 3;

Figure 4 is a cross-section view of an aerating device having the self-cleaning features shown in Figure 1 and being provided at its outlet end with means for discharging the aerated liquid in a plurality of discrete aerated streams;

Figure 5 is a cross-section view of an aerating device similar to that shown in Figure 1 but provided with a flared discharge nozzle for discharging the aerated water in a stream of a predetermined shape substantially different from the shape of the discharge stream in Figure 1, and which discharge stream shape is of very great length compared to its width;

Figure 6 is a fragmentary bottom view of the aerator shown in Figure 5 and is taken looking upwardly toward the aerator shown in Figure 5;

Figure 7 is a cross-section view of a commercial form of the self-cleaning coolant aerator;

Figure 8 is a cross-section view showing the aerator of Figure 7 provided with a stop-washer adapted to engage the plug member and provided with a flexible hose at the outlet end which afford means for directing the aerated fluid to wherever it is desired; and Figure 9 is a plan view of the stop-washer shown in Figure 8.

In the aerator shown in Figure 1, there is provided a casing 150, an annular guide ring 152, and a central plug member 154 having an upper gear disc portion 156 and a ball portion 158 depending therefrom. The gear disc 156 cooperates with the guide ring 152 to define fluid metering passageways therebetween. The guide ring 152 is also provided with conical guide surface 160 for directing the flow of liquid conically inwardly onto the rounded surface of the ball member 158 from whence the liquid rebounds into the aeration chamber 162 wherein the fluid is intimately mixed with air aspirated into the casing through air inlets 164. Downstream of the ball member 158 there is positioned a support member, or spider, 166 which is supported on a shoulder formed in the wall of casing 150. The spider 166 has a central hub portion 170 having a boss 172 thereon and a vertical bore 174 through said hub portion 170 and through said boss portion 172.

There is formed on the underside of the ball member 158 a central recess 176. A helical spring 178 is positioned between the spider 166 and the plug member 154. In particular, the spring 178 is positioned on the spider for fitting over the boss 172 with the upper end of the helical spring entering the recess 176 and engaging the plug member 154. The helical spring 178 is formed of such length and has such a spring constant that when there is no liquid passing through the aerator, then the plug member 154 is moved to the position shown in Figure 3 where the flow metering pasageways are opened. When liquid is passing through the aerator the pressure of liquid is operative to compress the helical spring 178 and to move the plug member downwardly to the position shown in Figure 1, wherein the flow passageways between the gear disc 156 and the guide ring 152 are reformed so that the aerator operates.

The movement of the plug member 154 to the position in Figure 3 is operative to dislodge dirt that may accumulate between the teeth of the gear disc and the wall of guide ring 152, and in addition, upon the initial flow of liquid through the aerator, said initial flow is operative to flush out the dirt from the fluid metering passageways.

The ball member 158 is provided with a downwardly depending flange 180 which extends around the edge of the recess 176. The purpose of flange 180 is to further assure alignment between the helical spring 178 and the plug member 154 and to keep foreign matter out.

The spider 166 carries in the bore 174 therethrough, a manually operable stem member 182. The upper portion 183 of the stem member 182 is enlarged so that it will seat upon boss 172 and thus the stem member 182 is retained in position on the spider 166. The upper portion 183 of the stem member is positioned substantially concentrically within the helical coil 178. The stem member and the wall of the recess 176 cooperate to define an annular space within which the helical coil 178 is positioned. The other purpose of stem 182 is that when the lower end of the aerator is open and accessible therethrough, as shown in Figure 3, the stem 182 may be manually lifted to the position shown in Figure 3, where the upper terminal edge of the stem 182 engages plug member 154 and maintains the plug member 154 in the elevated position against the pressure of liquid that may be passing through the aerator.

The use of the stem 182 is optional in flushing out the aerator's flow metering passageways. There are certain benefits obtained by using stem 182, rather than using the spring-type cleaning features. In order to insure flushing out of the fluid flow passageways, the plug member 154 may be manually maintained in the elevated position by means of stem 182, as shown in Figure 3, and then the flow is initiated through the aerator. The pressure of the fluid passing the edges of the gear disc 156 and passing through the bore in the guide ring 152 is operative to clean off the flow defining edges and thus insures the flushing out of the flow passageways. The dirt and debris are carried by the liquid downwardly through the apertures 167 in the spider 166 and out from the discharge end of the aerator.

While the stem 182 is shown as separate and apart from the plug member 154, it will be appreciated that the stem member 182 may be formed integral with, or connected directly to, the plug member 154 in any appropriate manner, and thus the stem member 182 may be movable with the plug member 154 rather than being separate from the plug member, as shown in Figures 1-3. Figures 3A shows the stem member 182 butt welded at 183 to the plug member 154.

The outlet end of the aerator shown in Figure 1 is provided with a screen 184 which is retained in position by means of an annular ring 186 which is removably threaded to the lower end of the casing 150. An appropriate rubber seal, or washer, 188 may be provided between the screen 184 and the lower terminal edge of the casing 150. The aerator may be used either with the screen 184, as shown in Figure 1, or without the screen, as shown in Figure 3. In order to manually operate the stem 182 in the manner described above, it is necessary where the screen 184 and ring 186 are used to remove said members so as to obtain access to the stem 182, as shown in Figure 3.

The aerator shown in Figure 5 is substantially the same as the aerator shown in Figures 1 and 3 except that the outlet end of the aerator is provided with means for delivering the aerated stream in a stream of a particular cross section. These means include an annular ring portion 190 adapted to be threaded to the lower end of the casing 150 and which also serves to retain the screen 184 in position. Downstream of the screen 184 the means are shaped to define a discharge aperture of very great length as compared with the width, as best seen in Figure 6. This discharge shape may be referred to as a fish-tail 192. The primary purpose of such a shape is to deliver an aerated stream of relatively greater length as compared with the diameter of the aerator casing.

In the aerator shown in Figure 4, the aerating device is adapted to deliver aerated streams in a large plurality of distinct and separate aerated streams. For that purpose there is provided a transverse portion 194 which extends across the outlet of the aerator and which has a plurality of bores 196 therethrough. The axes of bores 196 are generally axially converging upstream of the transverse portion 194 and thus the aerator of Figure 15 delivers a plurality of divergent aerated streams. The form of the aerator shown in Figure 4 could be used as an aerated shower head or aerated spray. The total area of the bores 196 should be so related to the inside cross-section area of the casing 150 such that no undesirable back pressure is built up in the aerator which would destroy the aerating operation of the aerator. In other words, the size of the bores 196 should be of such size as to accommodate the entire flow of aerated liquid which is being produced by the aerator upstream of the transverse portion 194.

Figure 7 shows a commercial model of self-cleaning coolant aerator that has proved to be very successful in actual operations. Briefly, the aerator of Figure 7 includes a casing, or barrel, 200, havingair ports 202 therein, the combination guide and support ring 204, the plug member 206 having gear disc 208 and depending ball 210, said ball having recess 212 in its underside. There is also provided a spider 214 which may be retained in position by a press-fit ring 216, and helical spring 218 resting on spider 214 and entering recess 212 to normally bias the gear disc 208 away from the cooperating surfaces of guide ring 204. The downstream end of the casing 200 is provided with a screen 220 retained in position by annular cap 222. Appropriate gaskets 224 and 226 are also provided.

In Figure 8, the aerator of Figure 7 is provided with a flexible hose or conduit 228 at its discharge end for providing means for directing the aerated stream in any direction as desired. The flexible hose is of well known construction including a sheath 230 of flexible material wrapped around a helical wire coil 232. The flexible hose 228 is secured by any appropriate bonding means to cap 222, as shown, and the outlet end of the hose 228 may be provided with a discharge nozzle 234.

The aerator of Figure 8 is further provided with a stop-washer 235 having a plurality of inwardly extending arms 237 spaced above and overlying the plug member 206. The stop-washer 235 prevents the plug member 206 from falling out when the aerator is used in a horizontal or inverted position. The stop-washer 235 is also adapted to engage the plug member 206 when the spring 218 pushes the plug member away from its operating position within guide ring 204, and stop-washer 235 thus acts to limit, or stop, the motion of plug member 206. An appropriate sealing gasket, or washer, 236 is provided.

The aerators described herein may be used domestically in kitchens and bathrooms and may also be used industrially for use with machine tool coolants. The self-cleaning aerator of Figure 7 has been found to be particularly successful in aerating recirculating machine tool coolants without clogging thereof by the dirt and debris suspended in the coolant.

Thus, the self-cleaning aerator as described herein may be used for any household or industrial application, where it is desired to obtain either an aerated and/or a non-splash flow of liquid, which liquid might normally contain either particles, or sediment, or perhaps other foreign matter. In industrial applications, the non-splash fluid obtains a better wetting action, and thus is used wherever it is desired to cool or wash any material.

The aerators can also be used for aerating liquid comestibles, such as thawed out frozen fruit juices, for the purpose of enhancing the flavor thereof by restoring a more normal flavor thereto by incorporating air into the liquid comestible that is processed through the aerator.

While there has been shown and described a particular embodiment of this invention, it will be obvious to those skilled in the art that various changes and modifications may be made therein without departing from the invention and, therefor, it is intended in the appended claims to cover all such changes and modifications as fall within the true spirit and scope of the invention.

What we claim as new, and desire to secure by Letters Patent of the United States, is:

1. A liquid aerator comprising a casing having its upstream end adapted for connection to a source of liquid under pressure, said casing having air inlets therein, means within the casing for ingesting air into said casing through the air inlets and for breaking up the flow of liquid passing therethrough and for mixing the liquid with air ingested through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and a screen in said casing spaced downstream of said support member.

2. A liquid aerator comprising a casing having its upstream end adapted for connection to a source of liquid under pressure, said casing having air inlets therein, means within the casing for sucking air into the casing through the air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and fish-tail shaped means downstream of said support member for defining an aerated stream of discharged liquid of relatively great length and small width.

3. A liquid aerator comprising a casing having its upstream end adapted for connection to a source of liquid under pressure, said casing having air inlets therein, means within the casing for sucking air into the casing through the air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therbetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and apertured means downstream of said support member dividing the discharge flow of aerated fluid into a plurality of discrete aerated streams.

4. A liquid aerator comprising a casing having its upstream end adapted for connection to a source of liquid under pressure, said casing having air inlets therein, means within the casing for sucking air into the casing through the air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, a screen in said casing downstream of said support member, and apertured means downstream of said support member and said screen dividing the discharge flow of aerated fluid into a plurality of discrete divergent streams.

5. A liquid aerator comprising a casing having its upstream end adapted for connection to a source of liquid under pressure, said casing having air inlets therein, means within the casing for sucking air into the casing through the air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are reformed and the apparatus functions to produce an aerated flow of liquid, a screen in said casing downstream of said support member, stream forming means defining a transverse portion extending across the downstream end of said casing downstream of said screen, said transverse portion having a plurality of discharge apertures formed therein in a predetermined geometrical pattern for dividing the aerated flow of liquid into a plurality of discrete aerated streams.

6. A liquid aerator comprising a casing having its upstream end adapted for connection to a source of liquid under pressure, said casing having air inlets therein, means within the casing for sucking air into said casing through said air inlets and for breaking up the flow of liquid passing therethrough and for mixing the liquid with air sucked in through said air inlets, whereby the liquid issuing from the downstream end of the casing has small bubbles disseminated throughout, said means including a pair of flood control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, and a break-up member secured to said movable flow control member and positioned downstream of said flow control members, said break-up member being positioned to have the liquid which flows through said passageways impinge thereon to finely break up the liquid, a support member downstream of said break-up member, a recess in the downstream side of said break-up member, a helical spring on said support member entering said recess in the break-up member and engaging the break-up member, said helical spring normally biasing said movable flow control member to a position where the flow passageways between said flow control members are open, and said surfaces which are adapted for mating to form said flow passageways are exposed to permit flushing thereof, the pressure of liquid flowing through said aerator being operative to overcome the bias of said resilient means to move said movable flow control member to a position where the flow passageways are re-formed and the apparatus functions to produce an aerated flow of liquid, and an annular flange on said break-up member surrounding said recess and said helical spring and extending downstream of said break-up member.

7. A liquid aerator comprising a casing having its upstream end adapted for connection to a source of liquid under pressure, said casing having air inlets therein, means within the casing for sucking air into said casing through said air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, and a break-up member secured to said movable flow control member and positioned downstream of said flow control members, said break-up member being positioned to have the liquid which flows through said passageways impinge thereon to finely break up the liquid, a support member downstream of said break-up member, a recess in the downstream side of said break-up member, a helical spring on said support member entering said recess in the break-up member and engaging the break-up member, said helical spring normally biasing said movable flow control member to a position where the flow passageways between said flow control members are open, and said surfaces which are adapted for mating to form said flow passageways are exposed to permit flushing thereof, the pressure of liquid flowing through said aerator being operative to overcome the bias of said resilient means to move said movable flow control member to a position where the flow passageways are re-formed and the apparatus functions to produce an aerated flow of liquid, an annular flange on said break-up member surrounding said recess and said helical spring and extending downstream of said break-up member, and a manually operable stem positioned substantially concentrically within said helical spring and extending through said support member, and adapted, when manually operated, to engage and maintain said movable flow control member in a position where the passageways are open for flushing thereof by a fluid pressure greater than the bias of said spring.

8. A liquid aerator comprising a casing having its upstream end adapted for connection to a source of liquid under pressure, said casing having air inlets therein, means within the casing for sucking air into said casing through said air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageway are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and means carried by said aerator being manually operable to a position of operative association with said movable control member for selectively maintaining the passageways open against the pressure of liquid flowing therethrough to permit flushing of said passageways at a fluid pressure higher than the biasing force developed by said resilient means.

9. A liquid aerator comprising a casing having its upstream end adapted for connection to a source of liquid under pressure, said casing having air inlets therein, means within the casing for sucking air into said casing through said air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and means carried by said aerator being manually operable to a position of operative association with said movable control member for selectively maintaining the passageways open against the pressure of liquid flowing therethrough to permit flushing of said passageways at a fluid pressure higher than the biasing force developed by said resilient means, said means including a stem secured to said movable control member and positioned to be manually engaged when said movable member is in a position where said passageways are open, thereby affording means for maintaining the passageways open against the pressure of fluid flowing through the casing.

10. A liquid aerator comprising a casing having its upstream end adapted for connection to a source of liquid under pressure, said casing having air inlets therein, means within the casing for sucking air into said casing through said air inlets and for breaking up the flow of liquid passing therethrough and for mixing the liquid with air sucked in through said air inlets, whereby the liquid issuing from the downstream end of the casing has small bubbles disseminated throughout, said means including a pair of flow control members having adjacent mating surfaces which form liquid flow passageways therebetween, one of said flow control members being movable with respect to the other flow control member so as to expose the surfaces of said flow control members which are adapted to mate to form said liquid flow passageways to permit flushing of said surfaces by liquid passing through the aerator, a support member in the casing downstream of said flow control members, resilient means positioned between said support member and said movable flow control member and normally biasing said movable flow control member to a position where said flow passageways are open, and said surfaces which are adapted for mating to form said flow passageways are exposed to permit flushing thereof, and the pressure of liquid flowing through said aerator being operative to overcome the bias of said resilient means to move said movable flow control member to a position where the flow passageways are re-formed and the apparatus functions to produce an aerated flow of liquid, and means carried by said aerator being manually operable to a position of operative association with said movable control member for selectively maintaining the passageways open against the pressure of liquid flowing therethrough to permit flushing of said passageways at a fluid pressure higher than the biasing force developed by said resilient means, said means including a stem carried by said support member and manually operable to a position of operative association with said movable member where the passageways are maintained opened against the pressure of fluid flowing through the casing.

References Cited in the file of this patent

UNITED STATES PATENTS

| | | |
|---|---|---|
| 1,630,835 | Doyle | May 31, 1938 |
| 2,140,838 | Hart | Dec. 20, 1938 |
| 2,210,846 | Aghnides | Aug. 6, 1940 |
| 2,299,852 | Shaner et al. | Oct. 27, 1942 |
| 2,423,965 | Bicknell et al. | July 15, 1947 |
| 2,565,554 | Goodrie | Aug. 28, 1951 |
| 2,583,232 | Russell | Jan. 22, 1952 |
| 2,583,234 | Russell et al. | Jan. 22, 1952 |
| 2,633,343 | Aghnides | Mar. 31, 1953 |
| 2,643,104 | Holden | June 23, 1953 |
| 2,653,517 | Pigott | Sept. 29, 1953 |
| 2,675,218 | Bletcher | Apr. 13, 1954 |
| 2,680,649 | Hansen | June 8, 1954 |
| 2,688,515 | Filliung | Sept. 7, 1954 |
| 2,707,624 | Shammes et al. | May 3, 1955 |
| 2,811,340 | Aghnides | Oct. 29, 1957 |

FOREIGN PATENTS

| | | |
|---|---|---|
| 698,691 | Great Britain | Oct. 21, 1953 |
| 1,000,443 | France | of 1951 |